United States Patent
Janakiraman et al.

(10) Patent No.: US 7,310,605 B2
(45) Date of Patent: Dec. 18, 2007

(54) METHOD AND APPARATUS TO TRANSLITERATE TEXT USING A PORTABLE DEVICE

(75) Inventors: Janani Janakiraman, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/721,431

(22) Filed: Nov. 25, 2003

(65) Prior Publication Data

US 2005/0114145 A1    May 26, 2005

(51) Int. Cl.
*G06F 17/28* (2006.01)

(52) U.S. Cl. .......................... 704/277; 704/2

(58) Field of Classification Search ...................... None
See application file for complete search history.

(56) References Cited

U.S. PATENT DOCUMENTS

| | | | |
|---|---|---|---|
| 5,640,587 A | 6/1997 | Davis et al. | 395/800 |
| 5,812,818 A | 9/1998 | Adler et al. | 395/500 |
| 5,815,196 A | 9/1998 | Alshawi | 348/17 |
| 6,085,112 A * | 7/2000 | Kleinschmidt et al. | 455/556.1 |
| 6,115,482 A * | 9/2000 | Sears et al. | 382/114 |
| 6,219,646 B1 * | 4/2001 | Cherny | 704/277 |
| 6,407,673 B1 | 6/2002 | Lane | 340/901 |
| 6,460,015 B1 | 10/2002 | Hetherington et al. | 704/8 |
| 6,488,205 B1 * | 12/2002 | Jacobson | 235/380 |
| 6,522,889 B1 * | 2/2003 | Aarnio | 455/456.5 |
| 6,598,015 B1 | 7/2003 | Peterson et al. | 704/3 |
| 2001/0056342 A1 * | 12/2001 | Piehn et al. | 704/3 |
| 2002/0037104 A1 | 3/2002 | Myers et al. | 382/187 |
| 2002/0177992 A1 | 11/2002 | Andrews et al. | 704/5 |
| 2002/0194300 A1 | 12/2002 | Lin et al. | 709/217 |
| 2003/0009320 A1 | 1/2003 | Furuta | 704/2 |
| 2003/0078033 A1 | 4/2003 | Sauer et al. | 455/412 |
| 2003/0120478 A1 | 6/2003 | Palmquist | 704/3 |
| 2003/0140316 A1 | 7/2003 | Lakritz | 715/536 |
| 2003/0164819 A1 * | 9/2003 | Waibel | 345/173 |

* cited by examiner

*Primary Examiner*—Abul K. Azad
(74) *Attorney, Agent, or Firm*—Duke W. Yee; Jeffrey S. LaBaw; Rakesh Garg

(57) ABSTRACT

A method, apparatus, and computer instructions for a method in a portable device for transliterating text. An image of the text is generated using a camera function in the portable device. The image is sent with an identification of a source language and a target language to a transliteration service using a wireless communications link. A response is received from the transliteration service, wherein the response contains a transliteration of the text in the target language. The transliteration is then presented on the portable device. The presentation may be, for example, text displayed on the portable device or in the form of speech presented audibly to the user.

21 Claims, 5 Drawing Sheets

METHOD AND APPARATUS TO TRANSLITERATE TEXT USING A PORTABLE DEVICE

BACKGROUND OF THE INVENTION

1. Technical Field

The present invention relates generally to an improved data processing system and in particular to a method and apparatus for processing data. Still more particularly, the present invention relates to a method, apparatus, and computer instructions for transliterating text using a portable device.

2. Description of Related Art

Today, people are very mobile with respect to business and leisure travel. People often travel to foreign locations to conduct business or for vacation. Travel to foreign locations may cause travelers a number of problems when they are able to speak and understand the local languages, but are not familiar with reading the local languages in the place they are visiting. Common problems faced by travelers include reading road signs, train schedules, bus schedules, restaurant menus, and phone books.

With these types of situations, speaking the language is insufficient because the traveler is unable to read the language. A traveler needs to be able to read and understand words for the particular language as well. For example, if a traveler is at a train station, signs on the platforms of train stations typically have a destination city displayed in the local language. It would be beneficial to avoid having to ask a person nearby to read the sign. The same situation is present with respect to road signs or names in a phone book.

One solution provided for a traveler is an electronic dictionary that includes an ability to convert from a source language to a target language. Many of these electronic translators, however, have a limited number of languages and usually do not include names for places. For example, an electronic translating device may allow a user to enter words in a source language, such as Spanish, and have those words translated into a target language, such as English. Such a conversion requires an extra step when the user is able to understand Spanish but is unable to read Spanish.

Further, when the word is a name, such as that of a city, a street, or a person, a Spanish to English translation may not be present. Also, many languages use characters that may not be recognizable to travelers, who cannot read the language. For a traveler who can say the name of a city, but cannot read the name, a translation of the text may be useless. In this situation a transliteration of text into a form that can be phonetically read by the traveler is appropriate. One example is in Japan, a traveler may be unable to read "Tokyo Station" on a train if the name is in Kanji form that the traveler cannot read although the traveler can pronounce and understand the name.

Therefore, it would be advantageous to have an improved method, apparatus, and computer instructions for providing transliteration of text from a source language to a target language.

SUMMARY OF THE INVENTION

The present invention provides a method, apparatus, and computer instructions for a method in a portable device for transliterating text. An image of the text is generated using a camera function in the portable device. The image is sent with an identification of a source language and a target language to a transliteration service using a wireless communications link. A response is received from the transliteration service, wherein the response contains a transliteration of the text in the target language. The transliteration is then presented on the portable device. The presentation may be, for example, text displayed on the portable device or in the form of speech presented audibly to the user.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
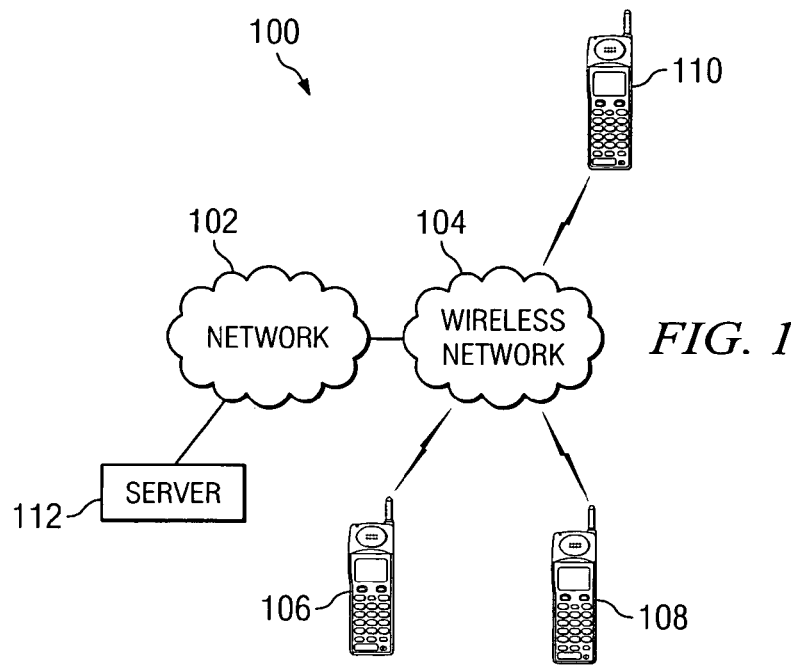
FIG. 1 is a diagram of a distributed data processing system in which the present invention may be implemented.

With reference now to the figures and in particular with reference to FIG. 1, a diagram of a distributed data processing system is shown in which the present invention may be implemented. In this example, distributed network data processing system 100 includes network 102 and wireless network 104. These networks provide the medium used to provide communications links between various devices and computers connected together within network data processing system 100. Network 102 may be implemented using various types of networks, such as, for example, a local area network (LAN), a wide area network (WAN), an intranet, the Internet, or some combination of these types of networks. In these examples, the different networks and gateways within network 102 use transmission control protocol/Internet protocol (TCP/IP) suite of protocols to communicate with one another.

Wireless network 104 is a wireless network typically used for voice communications between mobile communications units, such as cell phones. The access protocol used in wireless network 104 may take various forms, such as, for example, time division multiple access (TDMA) and code division multiple access (CDMA). A wireless transmission protocol, such as I.E.E.E. 802.11b, I.E.E.E. 802.11g, or Blue Tooth, also may be employed. These are protocols typically used to allow for communication between mobile communications units, such as mobile communications units 106, 108, and 110. In this example, server 112 is connected to network 102 and is an example of a component in which an illustrative embodiment of the present invention may be implemented.

In particular, server 112 may provide a transliteration service for mobile communications units 106, 108, and 110. These mobile communications units may be camera phones including an integrated or attached camera for sending images of text to transliteration in accordance with a preferred embodiment of the present invention.

Transliteration of text involves transforming or converting text in a source language into text in a target language. The text in the target language provides a phonetic pronunciation for pronouncing the text in the source language using characters in the target language. In other words, the text in the target language is in a phonetic form that allows the user to say or pronounce the text in the source language. In this manner a user who speaks a source language, but does not read the source language, can identify words by reading the word in a target language through the phonetic spelling provided in the target language.

Of course, depending on the particular implementation, the mobile communication units may be other types of portable devices containing a camera function and a wireless communications interface, such as a PDA containing a camera unit or a wireless transceiver.

Figure 2:
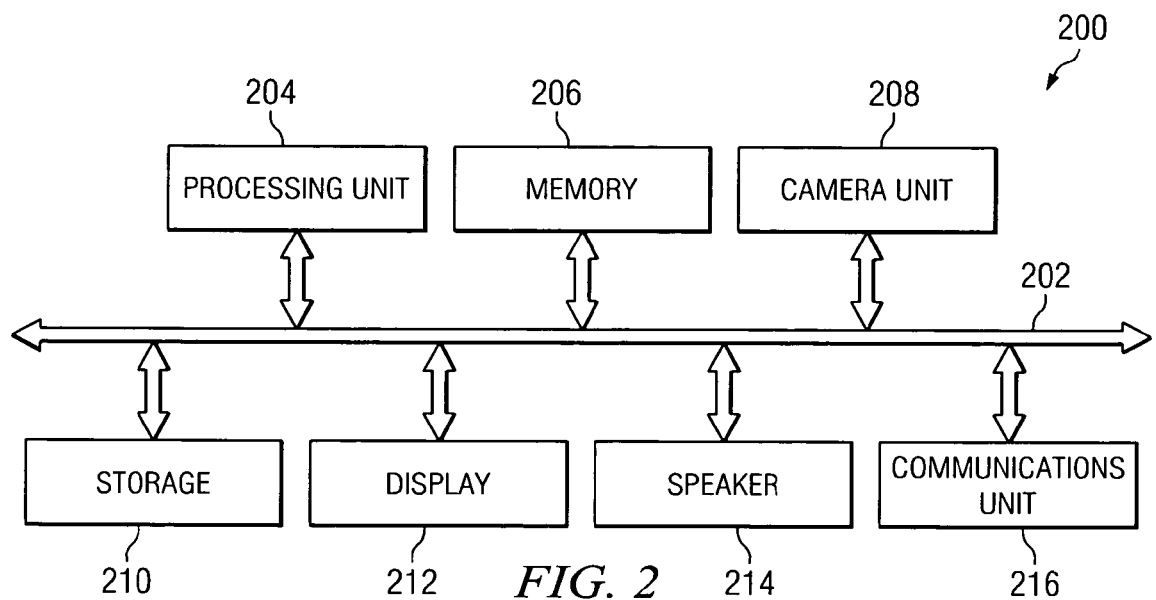
FIG. 2 is a diagram of a portable device for use in translating text in accordance with a preferred embodiment of the present invention.

Turning now to FIG. 2, a diagram of a portable device for use in transliterating text is depicted in accordance with a preferred embodiment of the present invention. Portable device 200 contains an interconnect fabric which takes the form of system bus 202 in this illustrative example. System bus 202 interconnects processing unit 204, memory 206, camera unit 208, storage 210, display 212, speaker 214, and communications unit 216.

Processing unit 204 executes instructions for processes, including those of the present invention used to transliterate text. Instructions executed by processing unit 204 may be located in memory 206 as well as data.

Camera unit 208 allows portable device 200 to capture images. In the illustrative examples, these images include images of text to be transliterated, such as text on a menu, a sign, a train schedule, or a bus schedule. Storage 210 provides for persistent or long-term storage. In particular, data and programs may be located in storage 210. Display 212 provides for a display of information to a user, such as images or text. Speaker 214 allows for an alternative presentation of data to a user. For example, music or text translated into speech may be presented through speaker 214. Communications unit 216 is a wireless communications unit in these examples and allows for portable device 200 to communicate with a remote data processing system.

Figure 3:
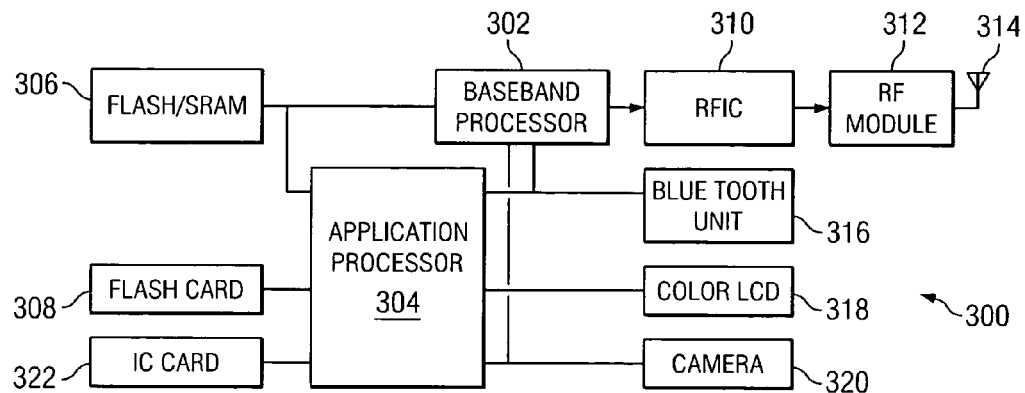
FIG. 3 is a block diagram of a camera phone in accordance with a preferred embodiment of the present invention.

Turning next to FIG. 3, a block diagram of a camera phone is depicted in accordance with a preferred embodiment of the present invention. Camera phone 300 includes baseband processor 302, application processor 304, flash/static random access memory (SRAM) 306, flash card 308, radio frequency integrated circuit (RFIC) 310, radio frequency (RF) module 312, antenna 314, Blue Tooth unit 316, color liquid crystal display (LCD) 318, camera 320, and IC card 322.

Baseband processor 302 provides for receiver and transmitter operations and is also referred to as a transceiver. In particular, baseband processor 302 handles all of the audio, signal, and data processing needed to receive and send data using RF transmissions or Blue Tooth transmissions. Application processor 304 provides the processing power for other functions within camera phone 300. For example, calculators, calendars, alarms, camera functions, and directories are provided through application processor 304. Flash/SRAM 306 is a storage device in which various instructions for providing the functions within camera phone 300 are located and provide upgrades. Flash card 308 is a storage device in which user data and applications may be stored. An example of flash card 308 is a secure digital card.

A pathway for the transmission of voice and other types of data is through RFIC 310. Additionally, short range transmissions may be sent or received through Blue Tooth unit 316. Blue Tooth unit 316 conforms to Blue Tooth wireless specification, which defines the link layer and application layer for product developers. Both of these transmissions are made through antenna 314 in this illustrative example.

Color LCD 318 provides a display for pictures and other data for camera phone 300. Camera 320, in this example, is a complementary metal oxide semiconductor (CMOS) camera which may be built into camera phone 300 or connected to camera phone 300 as a module, such as IC card 322. IC card 322 also may contain other application specific functions, such as a global positioning system (GPS) or functions, such as a modem or additional memory. Camera 320 forms the camera module of camera phone 300, while the other components form the digital phone module of camera phone 300 in these illustrative examples.

Figure 4:
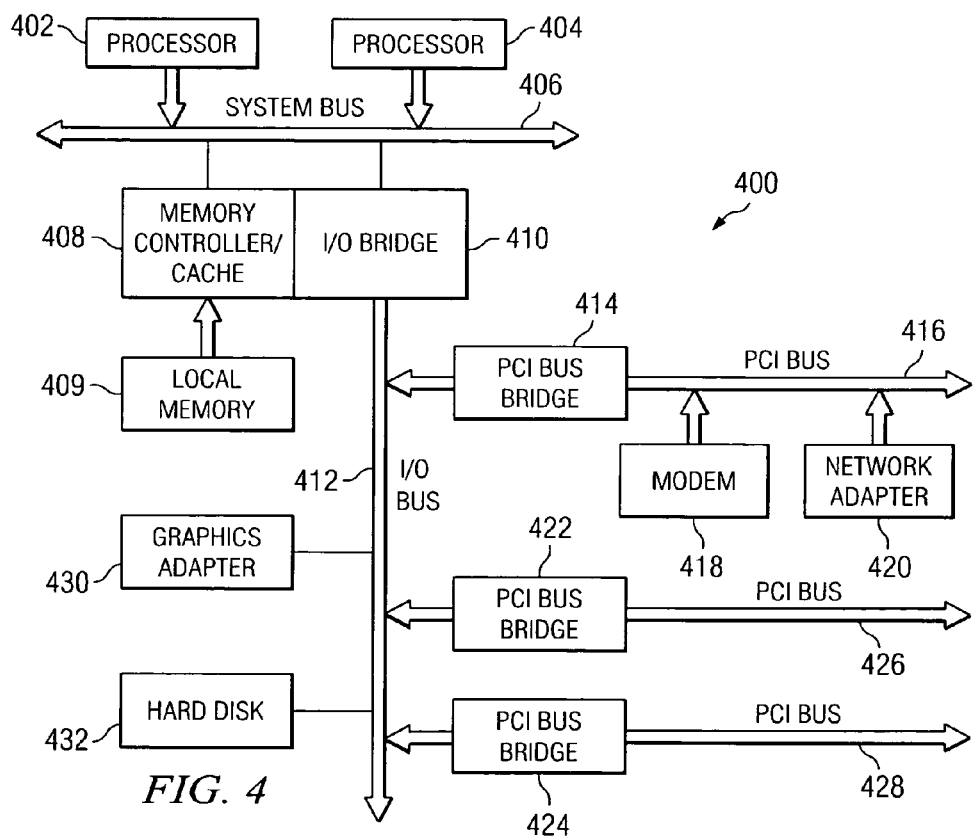
FIG. 4 is a block diagram of a data processing system that may be implemented as a server in accordance with a preferred embodiment of the present invention.

Referring to FIG. 4, a block diagram of a data processing system that may be implemented as a server is depicted in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to mobile communications units 106-110 in FIG. 1 may be provided through modem 418 and network adapter 420 connected to PCI local bus 416 through add-in boards.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM eServer pSeries system, a product of International Business Machines Corporation in Armonk, N.Y., running the Advanced Interactive Executive (AIX) operating system or LINUX operating system.

The present invention provides an improved method, apparatus, and computer instructions for providing transliteration services for a portable device. The portable device in these examples includes a camera function and an interface to transmit data to a remote system, such as a transliteration server.

Transliteration involves converting text from a source language into a phonetic form in a target language, wherein the phonetic form of the word may be properly pronounced for the source language. Transliteration is useful for users who speak a source language, cannot read words in the source language, but read in the target language. More information on transliteration may be found in U.S. Pat. No. 6,460,015, which is incorporated herein by reference.

In the illustrative examples, a mobile phone containing a camera may be adapted to include instructions for this particular purpose. Additionally, a PDA with a camera function and a wireless communications function also may be used to translate text. In the illustrative embodiments, to obtain transliterated text in a target form, a user aims the portable device towards the text, captures an image of the text in the source language, and transmits this text to a transliteration server. In response, transliterated text is returned from the transliteration server to the portable device for presentation to the user. If the transliteration of the text is in a text form, this text contains a phonetic pronunciation of the word in the source language using characters in the target language. Such a feature is especially useful when the source and target language use different characters.

In these examples, a presentation of the transliteration may be through speech using a text-to-speech process so that the text is audibly presented to the user. In this type of presentation, the speech uses the pronunciation in the source language. The text-to-speech conversion may be performed either by the transliteration service or by a process in the portable device.

Figure 5:
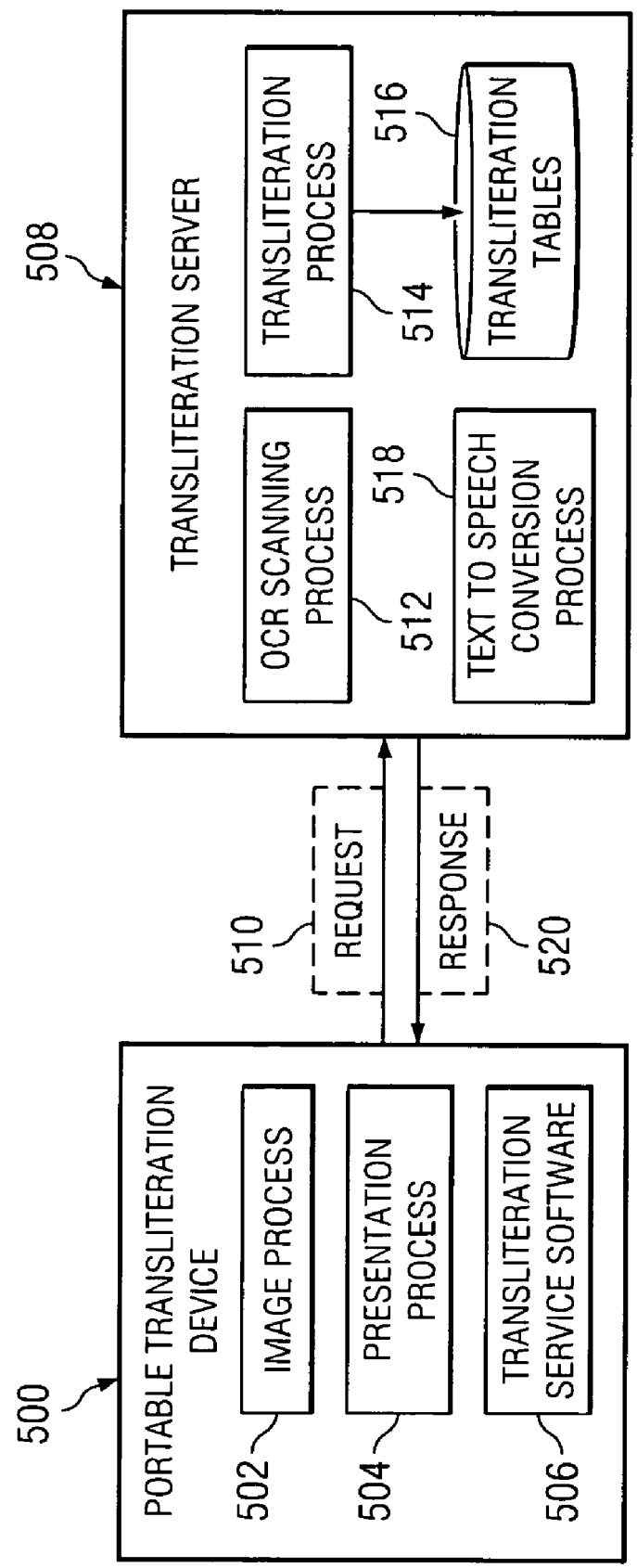
FIG. 5 is a diagram illustrating components used in providing transliteration services for a portable device in accordance with a preferred embodiment of the present invention.

Turning next to FIG. 5, a diagram illustrating components used in providing transliteration services for a portable device is depicted in accordance with a preferred embodiment of the present invention. In this example, portable translation device 500 contains image process 502, presentation process 504, and transliteration service software 506. Portable transliteration device 500 may take the form of a mobile device, such as cell phone 300 in FIG. 3. Alternatively, portable transliteration device 500 may be any portable device containing a camera, a wireless communications function, and an ability to present data either visually and/or audibly. Another example of a portable transliteration device is a personal digital assistant containing the appropriate functionality.

A user initially may select a default source language and target language. Further, the user also configures or sets a location of a transliteration server, such as transliteration server 508. This location may be set through the use of a universal resource locator (URL), an Internet Protocol (IP) address, or some other location information.

When a user sees text that the user would like to have transliterated, a picture of the text is taken using a camera and captured through image process 502. This image is displayed using presentation process 504. At that time, the user may select portions or all of the image for transliteration, using editing, cropping, or other photo functions provided through image process 502.

Transliteration service software 506 generates request 510 and sends request 510 to transliteration server 508. Request 510 includes the source language, the target language, and the image containing the text. If a speech to text conversion is desired, an indicator for such an option may be included in request 510. The default values may be used, or alternatively, the user may decide to set a different source and/or target language prior to transmitting request 510. Request 510 is received at transliteration server 508.

OCR scanning process 512 performs optical character recognition to generate text from the image. This text is in the source language. The source language and the target language identified in request 510 are used to identify data in transliteration tables 516 for use in transliterating the text from the source language to the target language. Transliteration process 514 performs a transliteration of the text into the target language with the data from transliteration tables 516. As a result, the transliterated text is now presented using characters in the target language in a phonetic form that allows a user to pronounce the words in the image as they would be pronounced in the source language using characters only from the target language.

After the text has been transliterated, this transliterated text is placed into response 520 and returned to portable transliteration device 500 for presentation. Depending on the particular implementation, this text may be converted into speech using text to speech conversion process 518 and presented audibly to the user. This conversion occurs at transliteration server 508 in these examples, but may be performed at portable transliteration device 500 depending on the implementation.

In the illustrative example, the response containing the transliterated text is presented using presentation process 504. In this manner, a user is able to obtain transliterations of text for many different source and target languages without having to have processes for the transliterations located on portable transliteration device 500. This mechanism in the illustrative embodiment of the present invention provides increased flexibility for the user traveling to different locations in which different local languages are used. The different transliteration data required are located on a remote server. The remote server has greater processing power for transliterating text and greater storage space for storing transliteration information used to perform transliterations.

Further, the mechanism of the present invention also avoids requiring the user to enter text for transliteration. Such a feature is especially useful in situations in which special characters are found in the source language which may be difficult if not impossible to enter correctly into the portable transliteration device.

Figure 6:
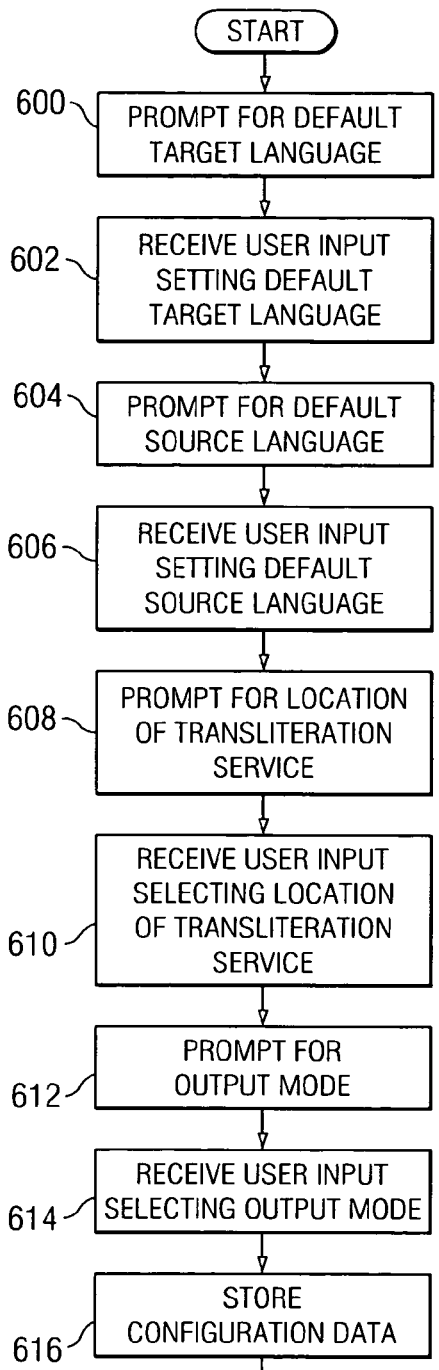
FIG. 6 is a flowchart of a process for configuring a portable transliteration device in accordance with a preferred embodiment of the present invention.

Turning now to FIG. 6, a flowchart of a process for configuring a portable transliteration device is depicted in accordance with a preferred embodiment of the present invention. The process illustrated in FIG. 6 may be implemented in a portable transliteration device, such as portable transliteration device 500 in FIG. 5.

The process begins by prompting for a default target language (step 600). A user input is received setting the default target language (step 602). Next, a prompt is made for a default source language (step 604). A user input is then received setting the default source language (step 606). A location of a transliteration service is requested through a prompt (step 608). A user input is then received selecting the location of the transliteration service (step 610). This user input may take various forms. For example, the prompt in step 608 may list a number of different transliteration services. The user may then select an appropriate transliteration service from the list. Alternatively, the user may also enter a URL or IP address of a transliteration service desired to be used by the user.

Next, the user is prompted for an output mode (step 612). In the illustrative examples, the output mode may be a display of text and/or a presentation of text converted to speech. A user input selecting the output mode is received (step 614). Thereafter, the configuration data is stored in the portable transliteration device (step 616) with the process terminating thereafter.

Figure 7:
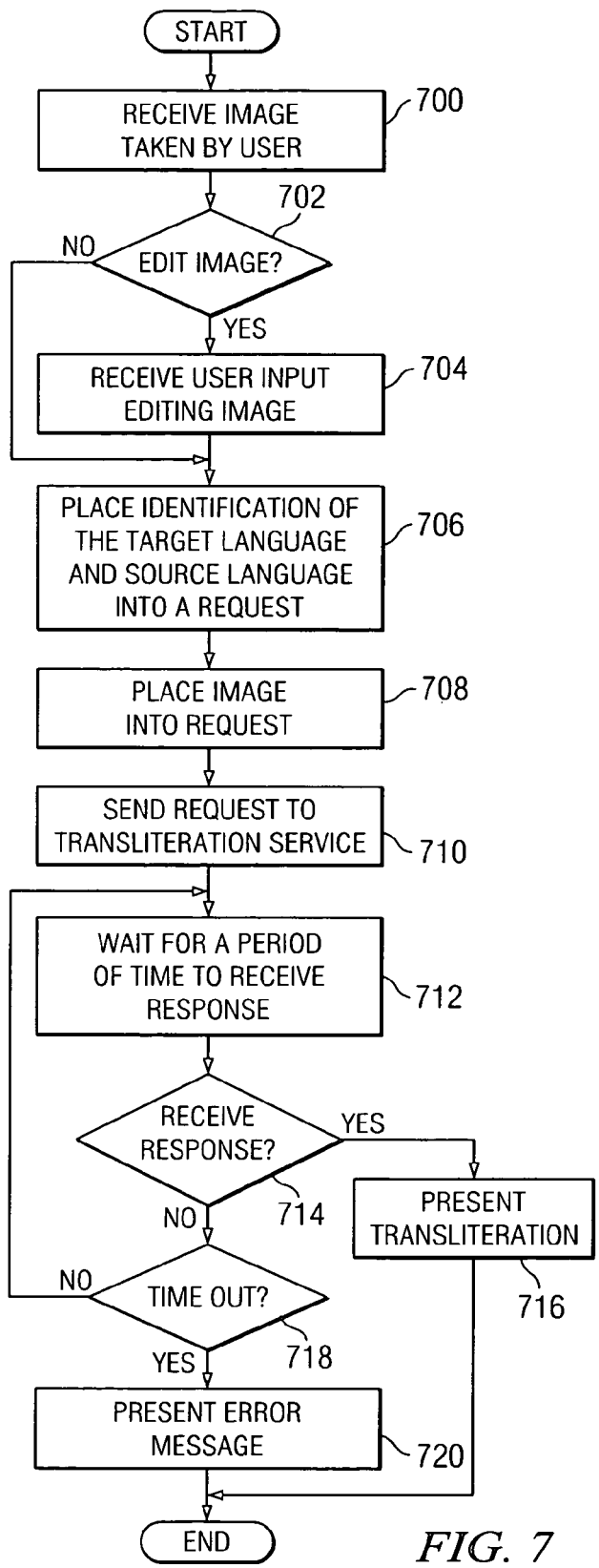
FIG. 7 is a flowchart of a process for transliterating text in accordance with a preferred embodiment of the present invention.

Turning next to FIG. 7, a flowchart of a process for transliterating text is depicted in accordance with a preferred embodiment of the present invention. The process illustrated in FIG. 7 may be implemented in a portable device, such as portable transliteration device 500 in FIG. 5. In particular, this process may be part of transliteration service software 506 in FIG. 5.

The process begins by receiving an image taken by the user (step 700). A determination is then made as to whether the user has decided to edit the image (step 702). If the user has decided to edit the image, user input editing the image is received (step 704). This editing may involve, for example, selecting a portion of the image or cropping the image to identify text that is to be transliterated. Then, an identification of the target language and the source language are placed into a request (step 706). If the user has not decided to edit the image, the process also proceeds to step 706. The image is placed into the request (step 708). Thereafter, the request is sent to a transliteration service based on the location information set by the user (step 710).

The process then waits to receive a response (step 712). A determination is made as to whether a response is received (step 714). If a response is received, the transliteration is then presented (step 716) with the process terminating thereafter. As described above, this presentation of the transliteration may take various forms, such as a display of text or a presentation of speech using a text-to-speech conversion process.

With reference again to step 714, if a response is not received, a determination is made as to whether a timeout has occurred (step 718). If a timeout has not occurred, the process returns to step 712. Otherwise, an error message is presented (step 720) with the process terminating thereafter.

Figure 8:
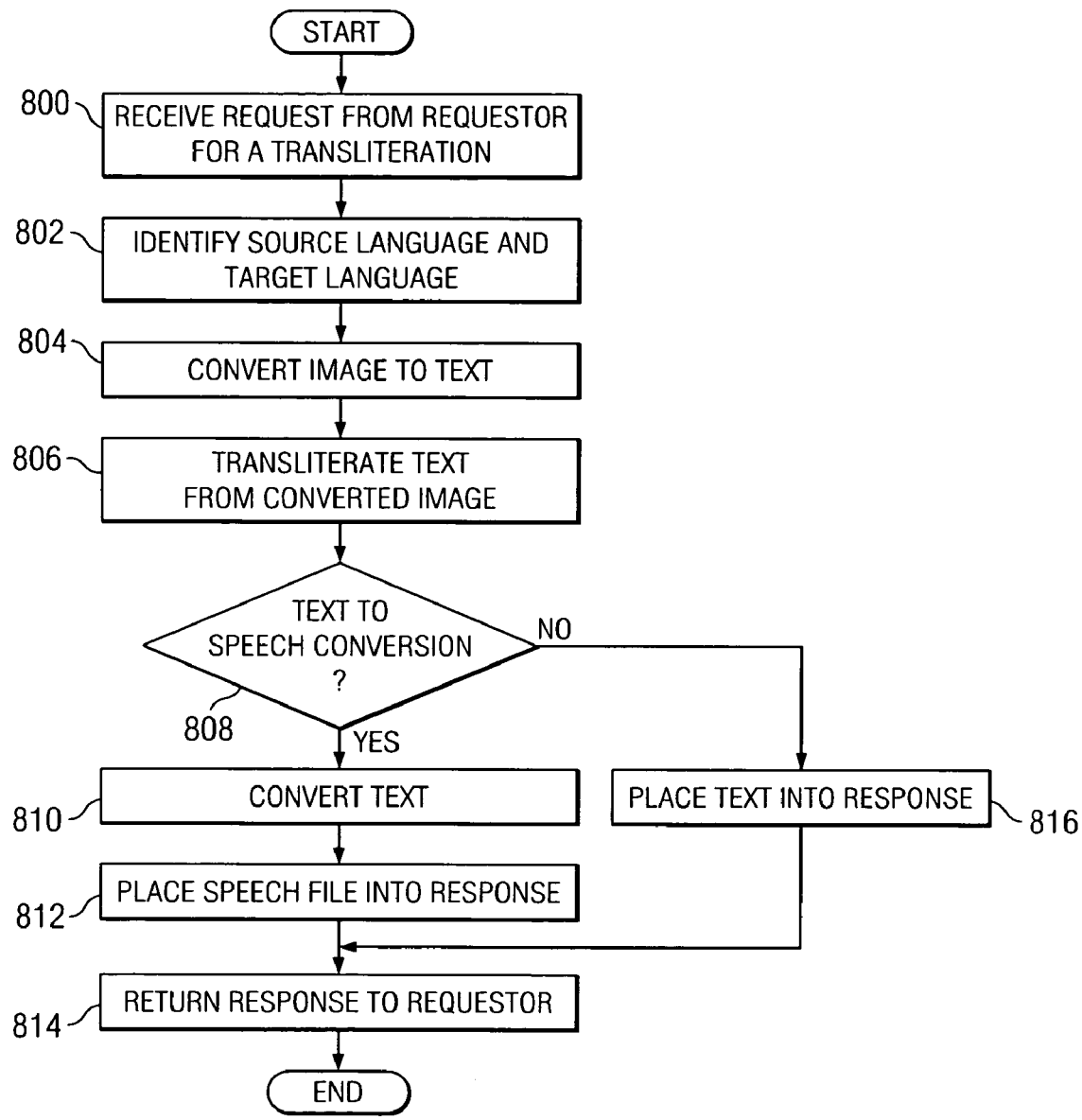
FIG. 8 is a flowchart of a process for transliterating text in accordance with a preferred embodiment of the present invention.

Turning next to FIG. 8, a flowchart of a process for transliterating text is depicted in accordance with a preferred embodiment of the present invention. The process illustrated in FIG. 8 may be implemented in a transliteration service, such as that provided by transliteration server 508 in FIG. 5.

The process begins by receiving a request from a requestor for a transliteration (step 800). A source language and target language for the transliteration is identified from the request (step 802). The image is then converted to text using an OCR process (step 804). Thereafter, the text obtained from the conversion of the image to text is transliterated from the source language into the target language (step 806).

A determination is made as to whether a text to speech conversion has been requested (step 808). If a text to speech conversion has been requested, the text is converted to speech using a text to speech conversion process (step 810). This determination may be made by looking for an indicator in the request that indicates a desire for a text to speech conversion. A file containing the speech is placed into the response (step 812), and the response is returned to the requester (step 814) with the process terminating thereafter. Depending on the implementation, the transliterated text also may be placed into the response with the speech file.

Turning back to step 808, if a text to speech conversion is not requested, the transliterated text is placed into the response (step 816). The response is then returned to the requester in step 814, with the process terminating thereafter.

Thus, the present invention provides an improved method, apparatus, and computer instructions for transliterating text using a portable device. The mechanism of the present invention takes an image of the text that is to be transliterated and sends that image to a transliteration process at a remote data processing system to the portable device. An OCR process is performed to obtain text from the image. The text is then transliterated from a source language to a text language with the transliteration then being returned to the portable device.

The mechanism of the present invention is especially useful when the source language and the target language use different types of characters because many users may be able to speak a source language but not read the characters in the source language. Further, many names cannot be translated into the target language for use by the user. The transliteration returned to the portable device contains a phonetic pronunciation of the word in the source language using characters in the target language. Additionally, the transliteration may take the form of speech in the source language.

In this manner, the mechanism of the present invention in the illustrative examples allows a user to transliterate text from many different source languages into many different target languages without requiring the user to have the appropriate software and translation tables required to be stored at the portable device. Thus, great flexibility in transliterations is provided even though the portable device may have limited processing power and storage. Further, this mechanism avoids having the user enter special characters found in some source languages.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a portable device for transliterating text, the method comprising:
   generating an image of the text using a camera function in the portable device;

sending the image with an identification of a source language and a target language to a transliteration service using a wireless communications link;

receiving a response from the transliteration service, wherein the response contains a transliteration of the text in the target language and wherein the transliteration contains a phonetic pronunciation used to pronounce the text in the source language using characters in the target language; and presenting the transliteration.

2. The method of claim 1, wherein the transliteration containing the phonetic pronunciation of the text in the source language is characters in the target language and wherein the presenting step comprises:

presenting the transliteration on a display in the portable device.

3. The method of claim 1, wherein text in the transliteration is converted into speech using a text to speech conversion process by the portable device or by the transliteration service.

4. The method of claim 1, wherein the transliteration service is located on a server on an Internet.

5. The method of claim 1, wherein the portable device is selected from one of a mobile phone, a personal digital assistant, and a table personal computer.

6. The method of claim 1, wherein the wireless communications link has a protocol using at least one of code division multiple access, time division multiple access, Blue Tooth, I.E.E.E. 802.11b, and I.E.E.E. 802.11g.

7. A method in a data processing system for transliterating text from a source language to a target language, the method comprising:

receiving a request from a portable device, wherein the request includes an image of the text an identification of the source language, and an identification of the target language;

performing optical character recognition on the image to generate the text;

transliterating the text from the source language to the target language to form transliterated text, wherein the transliterated text contains a phonetic pronunciation of the text from the source language using characters in the target language; and sending the transliterated text to the portable device.

8. A data processing system in a portable device for transliterating text, the data processing system comprising:

generating means for generating an image of the text using a camera function in the portable device;

sending means for sending the image with an identification of a source language and a target language to a transliteration service using a wireless communications link;

receiving means for receiving a response from the transliteration service, wherein the response contains a transliteration of the text in the target language and wherein the transliteration contains a phonetic pronunciation used to pronounce the text in the source language using characters in the target language; and presenting means for presenting the transliteration.

9. The data processing system of claim 8, wherein the transliteration containing the phonetic pronunciation of the text in the source language is characters in the target language and wherein the presenting means comprises:

means for presenting the transliteration on a display in the portable device.

10. The data processing system of claim 8, wherein text in the transliteration is converted into speech using a text to speech conversion process by the portable device or by the transliteration service.

11. The data processing system of claim 8, wherein the translation service is located on a server on an Internet.

12. The data processing system of claim 8, wherein the portable device is selected from one of a mobile phone, a personal digital assistant, and a table personal computer.

13. A data processing system for transliterating text from a source language to a source language, the data processing system comprising:

receiving means for receiving a request from a portable device, wherein the request includes an image of the text, an identification of the source language, and an identification of the target language;

performing means for performing optical character recognition on the image to generate the text;

translating means for transliterating the text from the source language to the target language to form transliterated text; and sending means for sending the transliterated text to the portable device.

14. A computer program product in a computer readable medium in a portable device for transliterating text, the computer program product comprising:

first instructions for generating an image of the text using a camera function in the portable device;

second instructions for sending the image with an identification of a source language and a target language to a transliteration service using a wireless communications link;

third instructions for receiving a response from the transliteration service, wherein the response contains a transliteration of the text in the target language and wherein the transliteration contains a phonetic pronunciation used to pronounce the text in the source language using characters in the target language; and fourth instructions for presenting the transliteration.

15. The computer program product of claim 14, wherein the transliteration containing the phonetic pronunciation of the text in the source language is characters in the target language and wherein the fourth instructions comprises:

sub-instructions for presenting the translation on a display in the portable device.

16. The computer program product of claim 14, wherein text in the transliteration is converted into speech using a text to speech conversion process by the portable device or by the transliteration service.

17. The computer program product of claim 14, wherein the transliteration service is located on a server on an Internet.

18. The computer program product of claim 14, wherein the portable device is selected from one of a mobile phone, a personal digital assistant, and a table personal computer.

19. A computer program product in a computer readable medium for transliterating text from a source language to a source language, the computer program product comprising:

first instructions for receiving a request from a portable device, wherein the request includes an image of the text, an identification of the source language, and an identification of the target language;

second instructions for performing optical character recognition on the image to generate the text;

third instructions for transliterating the text from the source language to the target language to form translated text, wherein the transliterated text contains a phonetic pronunciation of the text from the source language using characters in the target language; and
fourth instructions for sending the transliterated text to the portable device.

20. A portable device comprising:
a bus system;
a memory connected to the bus system, wherein the memory includes a set of instructions; and
a processing unit connected to the bus system, wherein the processing unit executes the set of instructions to generate an image of the text using a camera function in the portable device; send the image with an identification of a source language and a target language to a transliteration service using a wireless communications link; receive a response from the transliteration service, wherein the response contains a transliteration of the text in the target language and wherein the transliteration contains a phonetic pronunciation used to pronounce the text in the source language using characters in the target language; and present the transliteration.

21. A data processing system comprising:
a bus system;
a memory connected to the bus system, wherein the memory includes a set of instructions; and
a processing unit connected to the bus system, wherein the processing unit executes the set of instructions to receive a request from a portable device, wherein the request includes an image of the text, an identification of the source language, and an identification of the target language; perform optical character recognition on the image to generate the text; transliterate the text from a source language to a target language to form transliterated text wherein the transliterated text contains a phonetic pronunciation of the text from the source language using characters in the target language; and send the transliterated text to the portable device.

* * * * *